Dec. 28, 1943.    N. D. STOKER    2,337,781
PROTECTIVE DEVICES FOR ELECTRICAL CONDUCTORS
Filed Oct. 23, 1941    2 Sheets-Sheet 1
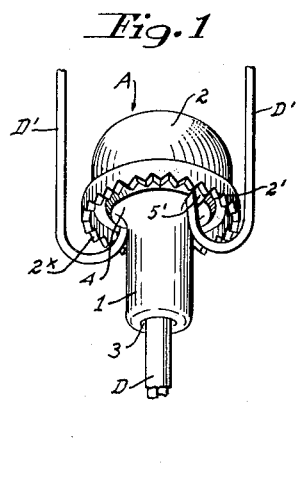
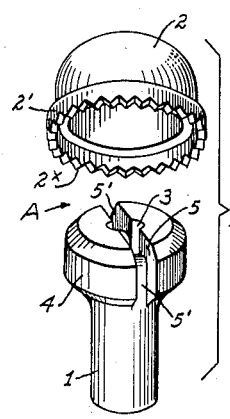
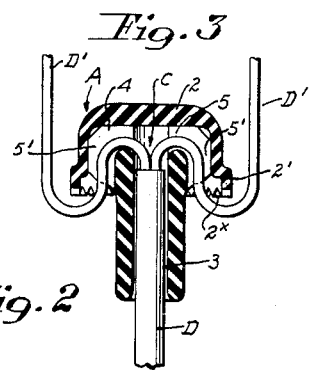
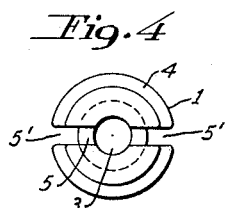
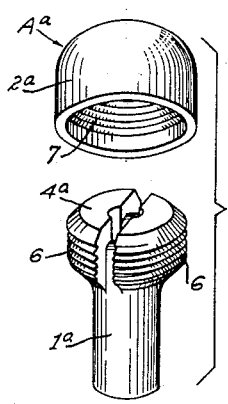
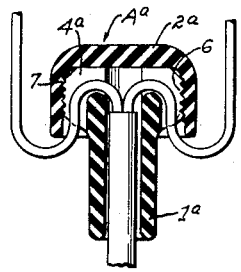
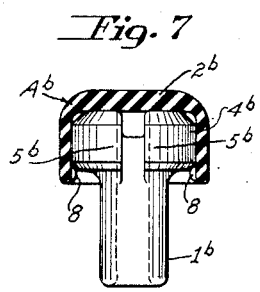
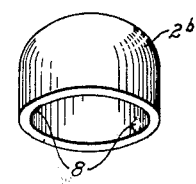
INVENTOR
NELSON D. STOKER
BY *Em. Harrington*
ATTORNEY Dec. 28, 1943.   N. D. STOKER   2,337,781
PROTECTIVE DEVICES FOR ELECTRICAL CONDUCTORS
Filed Oct. 23, 1941    2 Sheets-Sheet 2

INVENTOR
NELSON D. STOKER
BY
ATTORNEY

Patented Dec. 28, 1943

2,337,781

UNITED STATES PATENT OFFICE 2,337,781

PROTECTIVE DEVICE FOR ELECTRICAL CONDUCTORS

Nelson D. Stoker, St. Louis, Mo., assignor to James R. Kearney Corporation, St. Louis, Mo., a corporation of Missouri Application October 23, 1941, Serial No. 416,135

5 Claims. (Cl. 174—74)

This invention relates generally to protective devices for electrical conductors, and more specifically to improved devices adapted to be applied to outdoor wiring of telephone and other communication systems for the purpose of maintaining in a dry condition at all times certain portions of drop wire connections which if permitted to become damp or wet would in time result in deterioration of the insulation thereof so as to cause short circuiting of the current across the drop wire connections, the predominant object of the invention being to provide extremely simple devices of this type which are capable of performing their intended functions in a highly efficient manner.

As is quite generally known to persons familiar with such matters, electrical connection is made between overhead, outdoor wires of two wire metallic circuits of telephone and other communication systems and the indoor wiring of such systems, by means of drop wires which include drop wire connections that are connected to said outdoor wires. The drop wires are ordinarily of the two-conductor type, comprising a pair of insulation-enclosed wires arranged within a protective braided sheath, and the drop wire connections are produced by stripping from portions of the two wires of the drop wire the enclosing protective braided sheath so as to expose end extensions of said two wires to provide the drop wire connections which extend to and are connected to different wires of the circuit with which the drop wire is associated. Because of the disposition of the drop wire connections when they are connected to overhead, outdoor wires of a communication circuit, a crotch is produced at the point where the drop wire connections pass from the braided sheath of the drop wire, and as this crotch provides an ideal gathering place for moisture which in time would cause deterioration of the insulation of the drop wire connections and thereby permit short circuiting of current across the drop wire connections, means must be provided to prevent such accumulation of moisture.

Prior to this invention the task of maintaining the crotched portions of drop wire connections of drop wires in a dry condition was a troublesome and time-consuming one, one method being to apply insulating tape about a portion of the drop wire and adjacent crotched portions of the drop wire connections with the hope that such tape would be sufficient to exclude moisture from the crotched portions of the drop wire connections. Another method was to splice to the two- conductor type of drop wire a conductor of the twisted-pair type which provided the drop wire connections and which would resist the deteriorating effect of accumulated moisture to better advantage because each wire thereof is individually insulated and is enclosed within its individual protective, braided sheath.

The main purpose of the present invention therefore is to provide simple and inexpensive devices which may be applied in a convenient and expeditious manner to a drop wire so that when so applied the troublesome crotched portions of the drop wire connections will be maintained at all times in a dry condition. Thus, because of the protected condition of the crotched portion of the drop wire connections, accumulation of moisture and consequent deterioration of the insulation of the drop wire connections is prevented, and the likelihood of short circuits being produced across the drop wire connections is eliminated.

Fig. 1 is a perspective of one of the improved protective devices of the present invention assembled with a drop wire.

Fig. 2 is a perspective of the device illustrated in Fig. 1 but showing same in a disassembled condition.

Fig. 3 is a vertical section of the device illustrated in Figs. 1 and 2 showing said device as it appears when assembled for use with a drop wire.

Fig. 4 is a plan view of the body portion of the device illustrated in Figs. 1, 2, and 3.

Fig. 5 is a perspective of a slightly modified form of the invention showing the device illustrated thereby in a disassembled condition.

Fig. 6 is a vertical section of the device illustrated in Fig. 5 as same appears when assembled for use with a drop wire.

Fig. 7 is a view partly in elevation and partly in section of another modified form of the invention.

Fig. 8 is a perspective of the cap of the device illustrated in Fig. 7.

Figure 9:
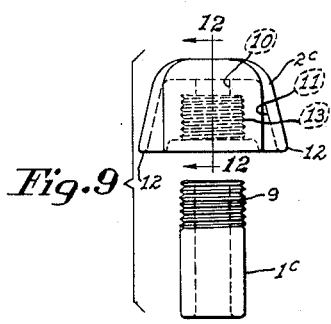
Fig. 9 is a side elevation of still another form of the invention showing the device illustrated thereby in a disassembled condition.

In the drawings, wherein are shown for the purposes of illustration, merely, several embodiments of the invention, A designates generally in Figs. 1, 2 and 3 the device illustrated thereby. The device A illustrated in the views mentioned comprises a body portion 1 and a cap 2 both of which are formed of a suitable electrical insulating material, the body portion 1 being illustrated also in Fig. 4. The body portion 1 is of generally cylindrical formation being somewhat elongated and having an opening 3 formed longitudinally therethrough. At its upper end the body portion 1 is provided with a head portion 4 which is of greater diameter than is the lower portion of said body portion as is shown to the best advantage in Fig. 2.

The heat 4 of the body portion 1 has formed therein a slot, a horizontal portion 5 of said slot being extended transversely across the top portion of said head and vertical portions 5' of said slot being formed in diametrically opposed portions of the head 4 outwardly of the cylindrical wall of the body portion 1. The slot portion 5—5' are of a width which is slightly less than the diameter of the opening 3, and said slot portions are open at the top face of the head 4 and at opposed portions of the circumferential face of said head 4. As shown in Fig. 3 the top edge of the cylindrical wall of the body portion 1 provides the base of the horizontal slot portion 5, and opposed, upper portions of said cylindrical wall of said body portion provide the inner walls of the vertical slot portions 5'.

The cap 2 of the protective device A includes a top wall downwardly from which an annular, marginal wall is extended, and the inner diameter of said cap is substantially the same as the outer diameter of the head 4 of the body portion 1 so that when the cap is forced over the head portion of the body portion, as shown in Figs. 1 and 3, secure frictional engagement between the body portion and the cap will be provided which will prevent unintended disengagement of said parts. Also, as is shown to the best advantage in Fig. 3, the annular side wall of the cap 2 extends downwardly below the top edge of the cylindrical wall of the body portion 1 a substantial distance when the cap is applied to the body portion.

When the improved protective device A is to be applied to a drop wire D the drop wire connections D' are arranged parallel and in alinement with the drop wire and said drop wire connections are threaded through the opening 3 of the body portion 1 of the device from the lower end thereof, the drop wire being also drawn through said opening until it is positioned as shown in Fig. 3. The drop wire connections are then bent outwardly and downwardly about opposed, upper portions of the cylindrical wall of the body portion and then are bent upwardly as is shown in Fig. 3, the outwardly and downwardly bent portions of the drop wire connections being disposed in the slot portions 5—5. The cap 2 is then applied to the head portion 4 of the body portion 1, being forced thereover as is also shown in Fig. 3, so that the inner face of the annular wall of the cap frictionally engages the outer circumferential face of the head portion 4 of the body portion 1 so as to securely fix the cap to the body portion. Electrical connection between the drop wire connections and the wires of the telephone system is then made and the lower end of the drop wire is connected to the indoor wiring of the telephone system.

If desired the lower portion of the circumferential wall of the cap 2 may be flared, as indicated at 2' in Figs. 1, 2, and 3, so that production of sharp, insulation destructive bends in the drop wire connections D' will be avoided where said drop wire connections are bent about the lower edge of said cap. Also, if desirable, the lower edge portion of the circumferential wall of the cap 2 may be serrated, as indicated at 2ˣ, or otherwise rendered irregular, so that spreading of moisture at the lower edge of said circumferential wall of the cap, which might serve as a short circuit path, will be prevented.

It is obvious that when the protective device A has been assembled in place in association with a drop wire as described, a dry spot is provided within the upper portion of the body portion 1 and within the cap 2 which prevents accumulation of moisture in the crotch C produced by the outwardly bent portions of the drop wire connections, whereby deterioration of the insulation of the drop wire connections and short circuiting of the current across the drop wire connections because of the deteriorated condition of said insulating is prevented.

The form of the invention illustrated in Figs. 5 and 6 differs from the form of the invention shown in Figs. 1 to 4, inclusive, only in that the cap 2a is screwthreadedly mounted on the head portion 4a of the body portion 1a. In other words, screwthreads 6 are formed on the circumferential face of the head portion 4a of the body portion 1a, and similar screwthreads 7 are formed on the inner face of the annular, circumferential wall of the cap 2a, the screwthreads 6 and 7 engaging each other when the cap is screwed on the head portion of the body portion of the device Aa.

The device Ab illustrated in Figs. 7 and 8 differs from the two forms of the invention previously described herein in the manner in which the cap 2b is secured to the body portion 1b; that is to say, the annular, circumferential wall of the cap 2b has formed thereon oppositely located, inwardly projected extensions 8 which serve to lock the cap in place on the head portion 4b of the body portion 1b. Locking of the cap 2b on the head portion 4b of the body portion 1b of the device Ab is effected by so applying the cap to the head portion of the body portion that the extensions 8 pass downwardly through the opposed vertical portions 5b of the slot of the head portion of the body portion, the cap being rotated slightly when the extensions 8 have passed out of the lower ends of said vertical slot portions to cause said extensions to engage beneath solid portions of the lower face of the head portion of the body portion 1b.

Also, if desired, the cap of Figs. 7 and 8 may be forced over the head portion 4b with the extensions 8 in contact with unslotted portions of said head portion, the circumferential wall of the cap yielding slightly and the extensions snapping beneath the head portion to lock the cap thereon.

Figure 10:
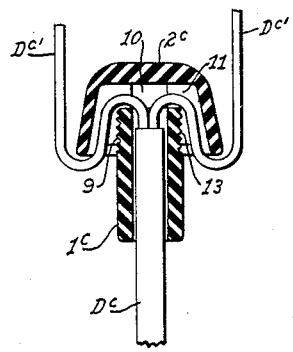
Fig. 10 is a vertical section of the device illustrated in Fig. 9 showing same as it appears when assembled for use with a drop wire.
Figure 11:
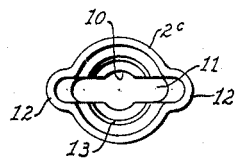
Fig. 11 is an inverted plan view of the cap of the device illustrated in Figs. 9 and 10.
Figure 12:
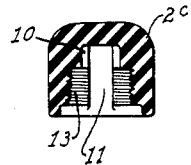
Fig. 12 is a section of the cap of the device illustrated in Figs. 9, 10, and 11 taken on line 12—12 of Fig. 9.

The form of the invention illustrated in Figs. 9, 10, 11, and 12 includes a body portion 1c and a cap 2c formed of suitable insulating material, the body portion being of elongated tubular form and being provided with external screwthreads 9 at its upper end. The cap 2c is provided with a top wall from which is extended downwardly a marginal wall which is shaped in inverted plan as shown in Fig. 11. The interior of the cap is solid except for certain openings formed therein; in other words, the interior of the cap has formed therein a vertical opening 10 of circular cross-sectional shape which extends from the lower face of said solid interior of the cap to the lower face of the top wall of said cap. Also the interior portion of the cap has formed therein a slot 11 which is of slightly less width than the diameter of the opening 10 and which likewise extends from the lower face of the interior portion of the cap to the lower face of the top wall of the cap. As is shown in Fig. 11 the cap 2c is provided with opposed extensions 12 and the opposite lower end portions of the slot 11 are located within these extensions. In addition to the opening 10 and the slot 11, the cap 2c has formed therein a vertically extended, screwthreaded opening 13 which is of greater diameter than the vertical opening 10 and is adapted to screwthreadedly receive the screwthreaded upper end portion of the body portion 1c as shown in Fig. 10.

In the use of the form of the invention illustrated in Figs. 9, 10, 11 and 12, the drop wire connections Dc' are arranged parallel and in alinement with the drop wire Dc and said drop wire connections are threaded through the central opening of the body portion 1c, the drop wire being drawn to the position in which it is shown in Fig. 10. The drop wire connections are then bent outwardly and downwardly about opposed upper portions of the body portion 1c and are then bent outwardly and extend upwardly from the downwardly bent portions thereof as is shown in Fig. 10. The cap is then applied to the drop wire connections so that the outwardly and downwardly bent portions thereof are disposed in the slot 11 of the cap after which the cap is held stationary and the body portion 1c is rotated to screw the upper, screwthreaded end portion of said body portion into the screwthreaded opening 13 of the cap. When the device illustrated in Figs. 9, 10, 11 and 12, is assembled as described in association with a drop wire, a dry spot is provided within the device which effectively prevents moisture from accumulating in the crotch formed by the outwardly bent portions of the drop wire connections located immediately above the upper end of the sheath of the drop wire.

I claim:

1. In combination with a drop wire of the type comprising a pair of individually insulated conductors confined within a common sheath and employed outdoors where it is exposed to weather conditions, a device for protecting the insulation of said conductors from moisture at a point where said conductors emerge from the sheath of the drop wire in such manner as to produce a crotch, said device comprising a body portion formed of insulating material and having an opening adapted to receive a sheathed portion of said drop wire which is extended from below said body portion into said opening of said body portion with the sheath thereof terminating adjacent to the upper end of said body portion, and a cap in removable engagement with said body portion and arranged to embrace portions of the conductors of the drop wire where they emerge from the sheath of the drop wire in such manner as to produce a crotch so as to protect said conductor portions from moisture, the entire device being supported solely by the drop wire with unsheathed portions of the conductors of the drop wire passing from the crotch produced thereby out of said cap below the lower edge thereof and extending upwardly relative to the device.

2. In combination with a drop wire of the type comprising a pair of individually insulated conductors confined within a common sheath and employed outdoors where it is exposed to weather conditions, a device for protecting the insulation of said conductors from moisture at a point where said conductors emerge from the sheath of the drop wire in such manner as to produce a crotch, said device comprising a body portion formed of insulating material and provided with an enlarged head portion at an end thereof, said body portion having an opening formed longitudinally from end to end thereof and said head portion of said body portion being provided with horizontal slot portions open at the top face of said head portion and communicating with said opening and vertical slot portions that communicate with said horizontal slot portions and are open at the outer surface of said head portion, and a cap formed of insulating material and removably engaging an outer face of said head portion of said body portion, said opening of said body portion receiving a sheathed portion of the drop wire which extends upwardly through said opening from below said body portion and with the sheath thereof terminating adjacent to the upper end of said opening of said body portion, and unsheathed portions of the conductors of said drop wire being extended outwardly and downwardly through said slot portions of said body portion and out of said cap below its lower edge and upwardly relative to the device outside of said cap, said cap being arranged to embrace said head portion of the body portion of the device so as to exclude moisture from the point at which the conductors of the drop wire emerge from the sheath thereof in such manner as to produce a crotch, and the entire device being supported solely by the drop wire.

3. In combination with a drop wire of the type comprising a pair of individually insulated conductors confined within a common sheath and employed outdoors where it is exposed to weather conditions, a device for protecting the insulation of said conductors from moisture at a point where said conductors emerge from the sheath of the drop wire in such manner as to produce a crotch, said device comprising a body portion formed of insulating material and provided with an enlarged head portion at an end thereof, said body portion having an opening formed longitudinally from end to end thereof and said head portion of said body portion being provided with horizontal slot portions open at the top face of said head portion and communicating with said opening and vertical slot portions that communicate with said horizontal slot portions and are open at the outer surface of said head portion, and a cap formed of insulating material and removably engaging an outer face of said head portion of said body portion and provided with an outwardly extended lower portion, said opening of said body portion receiving a sheathed portion of the drop wire which extends upwardly through said opening from below said body portion and with the sheath thereof terminating adjacent to the upper end of said opening of said body portion, and unsheathed portions of the conductors of said drop wire being extended outwardly and downwardly through said slot portions of said body portion and out of said cap below its lower edge and upwardly relative to the device outside of said cap, said cap being arranged to embrace said head portion of the body portion of the device so as to exclude moisture from the point at which the conductors of the drop wire emerge from the sheath thereof in such manner as to produce a crotch, and the entire device being supported solely by the drop wire.

4. In combination with a drop wire of the type comprising a pair of individually insulated conductors confined within a common sheath and employed outdoors where it is exposed to weather conditions, a device for protecting the insulation of said conductors from moisture at a point where said conductors emerge from the sheath of the drop wire in such manner as to produce a crotch, said device comprising a body portion formed of insulating material and provided with an enlarged head portion at an end thereof, said body portion having an opening formed longitudinally from end to end thereof and said head portion of said body portion being provided with horizontal slot portions open at the top face of said head portion and communicating with said opening and vertical slot portions that communicate with said horizontal slot portions and are open at the outer surface of said head portion, and a cap formed of insulating material and removably engaging an outer face of said head portion of said body portion and provided with an outwardly extended lower portion having a serrated lower edge, said opening of said body portion receiving a sheathed portion of the drop wire which extends upwardly through said opening from below said body portion and with the sheath thereof terminating adjacent to the upper end of said opening of said body portion, and unsheathed portions of the conductors of said drop wire being extended outwardly and downwardly through said slot portions of said body portion and out of said cap below its lower edge and upwardly relative to the device outside of said cap, said cap being arranged to embrace said head portion of the body portion of the device so as to exclude moisture from the point at which the conductors of the drop wire emerge from the sheath thereof in such manner as to produce a crotch, and the entire device being supported solely by the drop wire.

5. A device adapted for use in combination with a drop wire of the type comprising a pair of individually insulated conductors confined within a common sheath and employed outdoors where it is exposed to weather conditions, said device being adapted to protect the insulation of said conductors from moisture at a point where said conductors emerge from the sheath of the drop wire in such manner as to produce a crotch, said device comprising a body portion formed of insulating material and having an opening adapted to receive a sheathed portion of said drop wire which is extended from below said body portion into said opening of said body portion with the sheath thereof terminating adjacent to the upper end of said body portion, and a cap removably engaging said body portion and adapted to embrace portions of the conductors of the drop wire at the point where they emerge from the sheath of the drop wire in such manner as to produce a crotch so as to protect said conductor portions from moisture, the entire device being adapted to be supported solely by the drop wire with unsheathed portions of the conductors of the drop wire passing from the crotch produced thereby out of said cap below the lower edge thereof and extended upwardly relative to the device.

NELSON D. STOKER.